(12) United States Patent
Saito et al.

(10) Patent No.: US 8,301,023 B2
(45) Date of Patent: Oct. 30, 2012

(54) LENS APPARATUS

(75) Inventors: Tatsuo Saito, Saitama (JP); Tadayoshi Edamoto, Saitama (JP)

(73) Assignee: Fujifilm Corporation, Tokyo (JP)

( * ) Notice: Subject to any disclaimer, the term of this patent is extended or adjusted under 35 U.S.C. 154(b) by 27 days.

(21) Appl. No.: 12/977,787

(22) Filed: Dec. 23, 2010

(65) Prior Publication Data

US 2011/0158622 A1 Jun. 30, 2011

(30) Foreign Application Priority Data

Dec. 25, 2009 (JP) ................................. 2009-295476

(51) Int. Cl.
*G03B 17/00* (2006.01)
(52) U.S. Cl. .......................................... 396/79; 396/88
(58) Field of Classification Search ............... 396/79–82, 396/88
See application file for complete search history.

(56) References Cited

U.S. PATENT DOCUMENTS
5,758,206 A 5/1998 Imaoka
6,501,505 B1 * 12/2002 Kawamura et al. ........ 348/240.3

FOREIGN PATENT DOCUMENTS
JP 9-197261 7/1997
* cited by examiner

*Primary Examiner* — William B Perkey
(74) *Attorney, Agent, or Firm* — Young & Thompson

(57) ABSTRACT

The lens apparatus according to an aspect of the present invention includes: a focus lens which is driven for bringing a desired subject into focus; a zoom lens which is driven for changing a focal length; and a diaphragm having an aperture diameter which is changed for adjusting an amount of photography light, and the lens apparatus is configured to adjust a position of the focus lens, to thereby perform flange back distance adjustment. In such a lens apparatus, the aperture diameter of the diaphragm is changed at a time of mode transition between a photography mode in which a normal photographing operation is possible and an adjustment mode in which the flange back distance adjustment is possible. Accordingly, the user can instantly know whether or not the lens apparatus is in the flange back distance adjustment mode, only by checking a video picture photographed by a television camera.

18 Claims, 5 Drawing Sheets

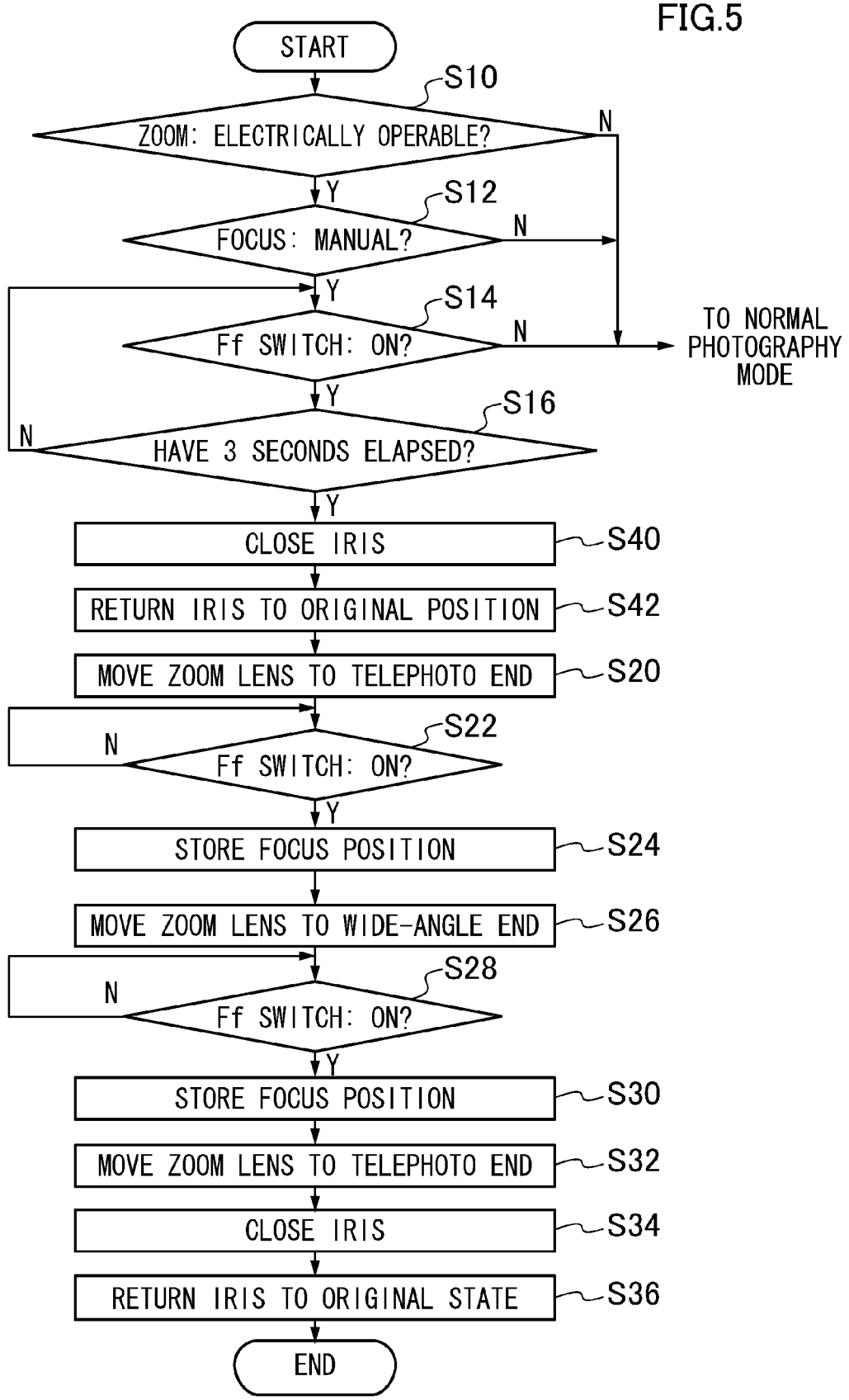

LENS APPARATUS

BACKGROUND OF THE INVENTION

1. Field of the Invention

The present invention relates to a lens apparatus, and more particularly, to a lens apparatus including a flange back distance adjusting mechanism.

2. Description of the Related Art

Up to now, as a lens apparatus which is used in a television camera for broadcasting, business use, or the like, there has been known a lens apparatus including a mechanism which automatically or manually adjusts a distance (that is, a flange back distance) from a flange surface (attachment surface) of a rear end of a lens holding frame to an imaging surface (a light receiving surface of an image pickup element of the camera) when the lens apparatus is fitted to a camera main body.

For example, a lens apparatus described in Japanese Patent Application Laid-Open No. 09-197261 is provided with a special switch for making the transition to a flange back distance adjustment mode, and when this special switch is pressed, the flange back distance adjustment is automatically performed.

Incidentally, a lens operation when the flange back distance adjustment is carried out is different from that at the time of normal photography, and hence the normal photographing operation cannot be performed when the lens apparatus is in the flange back distance adjustment mode. Meanwhile, if the lens apparatus is operated in the same manner as at the time of the normal photography without knowing that the lens apparatus is in the flange back distance adjustment mode, the flange back distance adjustment is not properly carried out. Therefore, it is convenient if a photographer (user) can know whether or not the lens apparatus is in the flange back distance adjustment mode.

The lens apparatus described in Japanese Patent Application Laid-Open No. 09-197261 is provided with a display part which indicates an operation state of the flange back distance adjustment. When the adjustment operation of the flange back distance is being performed, the display part is blinked on and off, to thereby warn a photographer that the normal operation is impossible. At the timing at which the adjustment operation is finished, the display part is lighted, to thereby indicate that the flange back distance has been adjusted.

SUMMARY OF THE INVENTION

However, the flange back distance adjustment is performed as needed under a limited situation, for example, when the lens apparatus is first fitted to a camera main body, and is performed less frequently than normal operations (such as a zoom operation, a focus operation, and an iris operation) at the time of photography.

In addition, a display device which is additionally provided for notifying a user of the operation state of the flange back distance adjustment becomes a factor for an increase in apparatus size and an increase in cost. Particularly in a portable lens and the like which are required to have a reduced apparatus size, it is desirable to enable a user to know whether or not the lens apparatus is in the flange back distance adjustment mode, without additionally providing the display device.

The present invention has been made in view of such circumstances, and therefore has an object to provide a lens apparatus which enables a user to know whether or not the lens apparatus is in the flange back distance adjustment mode, without additionally providing the display device.

In order to achieve the above-mentioned object, a lens apparatus according to a first aspect of the present invention includes: a focus lens which is driven for bringing a desired subject into focus; a zoom lens which is driven for changing a focal length; and a diaphragm having an aperture diameter which is changed for adjusting an amount of photography light, and the lens apparatus adjusts a position of the focus lens to perform flange back distance adjustment. The lens apparatus according to the first aspect further includes a diaphragm control device which changes the aperture diameter of the diaphragm at a time of mode transition between a photography mode in which a normal photographing operation is possible and an adjustment mode in which the flange back distance adjustment is possible.

According to the first aspect, at the time of the mode transition between the photography mode and the adjustment mode, the aperture diameter of the diaphragm is changed. Accordingly, a photographer can instantly know whether or not the lens apparatus is in a flange back distance adjustment mode, only by checking a video picture photographed by a television camera. As a result, it is possible to eliminate the need to additionally provide a display device or a display circuit therefor, and to downsize the lens apparatus and reduce the cost.

With regard to a lens apparatus according to a second aspect of the present invention, in the lens apparatus according to the first aspect, at a time of transition from the adjustment mode to the photography mode, the diaphragm control device changes the aperture diameter of the diaphragm to a minimum value, and then returns the aperture diameter to an original state of the aperture diameter.

With regard to a lens apparatus according to a third aspect of the present invention, in the lens apparatus according to the first or second aspect, at a time of transition from the photography mode to the adjustment mode, the diaphragm control device changes the aperture diameter of the diaphragm to the minimum value, and then returns the aperture diameter to the original state of the aperture diameter.

With regard to a lens apparatus according to a fourth aspect of the present invention, in the lens apparatus according to the second or third aspect, the diaphragm control device further changes the aperture diameter of the diaphragm to a maximum value after changing the aperture diameter to the minimum value, and then returns the aperture diameter to the original state of the aperture diameter.

With regard to a lens apparatus according to a fifth aspect of the present invention, the lens apparatus according to any one of the first to fourth aspects further includes a zoom lens control device which changes a position of the zoom lens at the time of the mode transition between the photography mode and the adjustment mode.

With regard to a lens apparatus according to a sixth aspect of the present invention, in the lens apparatus according to the fifth aspect, at the time of the transition from the photography mode to the adjustment mode, the zoom lens control device once moves the zoom lens to one of a wide-angle end and a telephoto end, and then moves the zoom lens to the other end.

With regard to a lens apparatus according to a seventh aspect of the present invention, in the lens apparatus according to the sixth aspect, at the time of the transition from the photography mode to the adjustment mode, the zoom lens control device once moves the zoom lens to the wide-angle end, and then moves the zoom lens to the telephoto end.

According to the present invention, at the time of the mode transition between the photography mode and the adjustment mode, the aperture diameter of the diaphragm is changed. Accordingly, a photographer can instantly know whether or not the lens apparatus is in a flange back distance adjustment mode, only by checking a video picture photographed by a television camera. As a result, it is possible to eliminate the need to additionally provide a display device or a display circuit therefor, and to downsize the lens apparatus and reduce the cost.

BRIEF DESCRIPTION OF THE DRAWINGS

FIG. 5 is a flow chart showing another example of the operation flow for the flange back distance adjustment.

DETAILED DESCRIPTION OF THE PREFERRED EMBODIMENTS

Hereinafter, with reference to the attached drawings, an embodiment of the present invention is described in detail.

Figure 1:
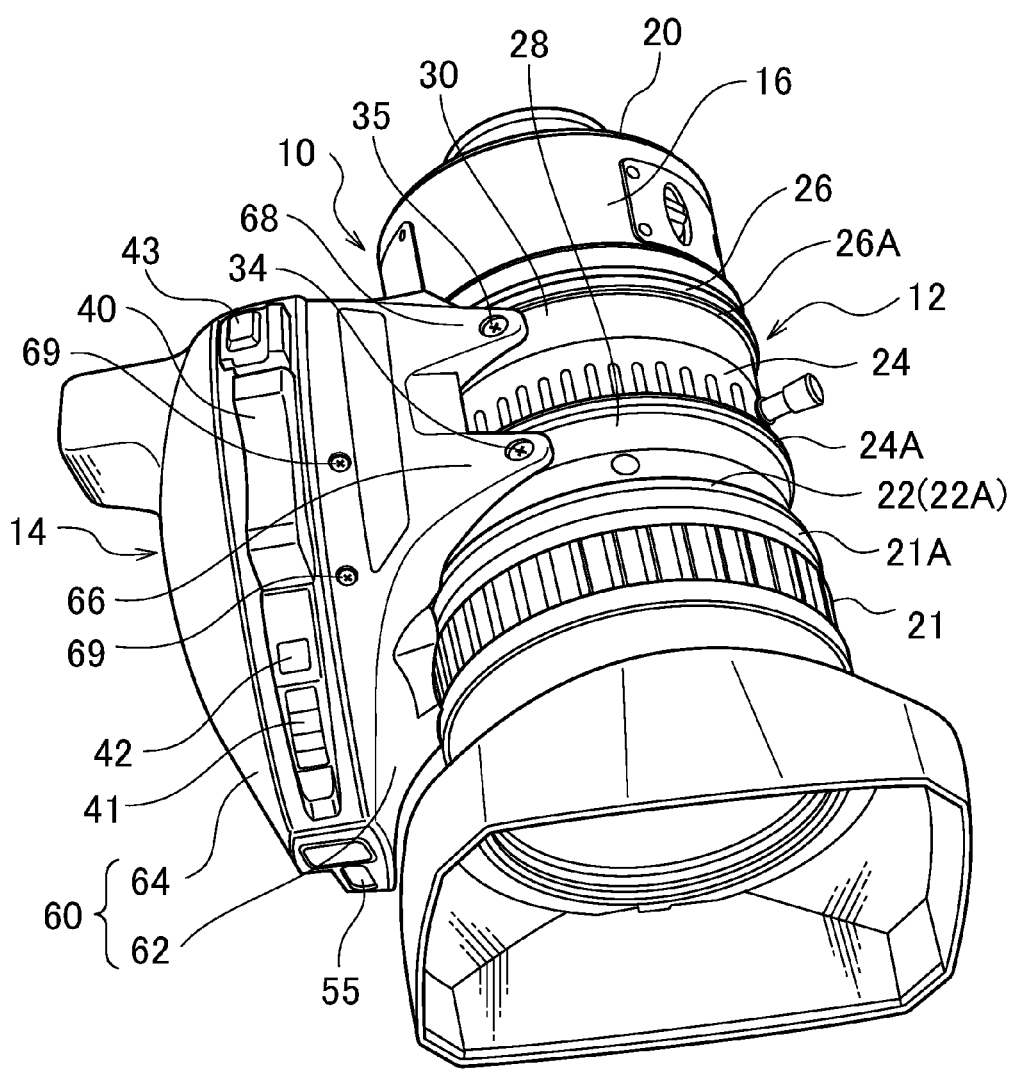
FIG. 1 is a perspective view illustrating an entirety of a lens apparatus according to an embodiment of the present invention.
Figure 2:
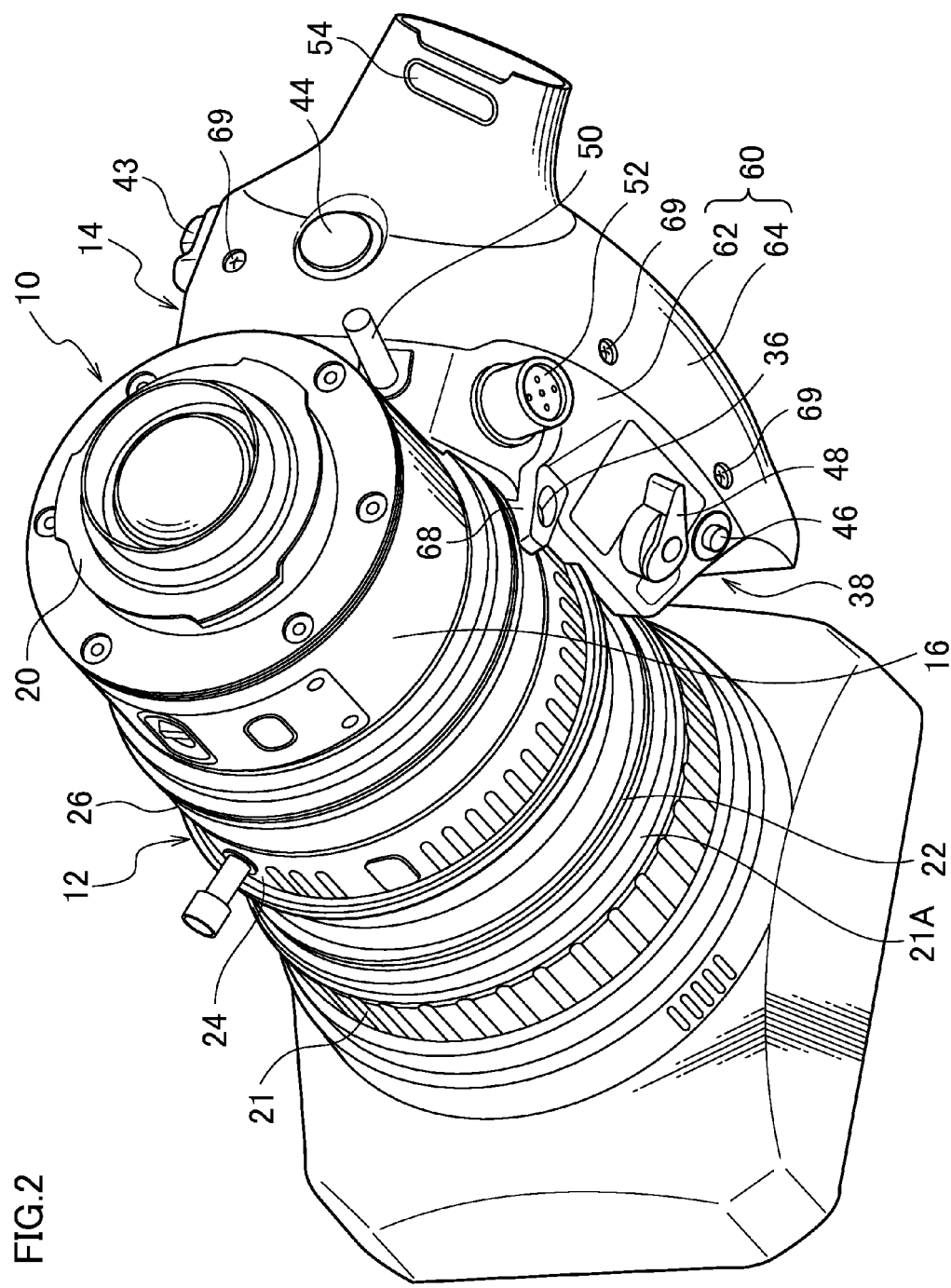
FIG. 2 is a view illustrating the lens apparatus according to the present embodiment, which is observed upward obliquely from a lower rear side thereof.

FIG. 1 is a perspective view illustrating an entirety of a lens apparatus according to an embodiment of the present invention. FIG. 1 illustrates the lens apparatus which is observed downward obliquely from an upper front side thereof. In addition, FIG. 2 is a view illustrating the lens apparatus which is observed upward obliquely from a lower rear side thereof. The lens apparatus 10 illustrated in FIGS. 1 and 2 is a lens apparatus which is fitted to a television camera (video camera) for broadcasting or business use which is carried mainly in news gathering activities, and corresponds to a lens apparatus which is categorized into a "portable lens", a "handy lens", an "ENG lens", and the like.

As illustrated in FIGS. 1 and 2, the lens apparatus 10 includes a lens holding frame 12 and a drive unit 14 which is placed in a lateral part of the lens holding frame 12. The lens holding frame 12 includes a bayonet-type mount part 20 at a rear end part thereof, and when the mount part 20 is engaged with a mount part of a camera main body (not shown), the lens holding frame 12 is fitted to the camera main body, to thereby configure the television camera.

As publicly known, lenses and a diaphragm which configure an optical system for imaging a subject image are housed inside the lens holding frame 12. The housed lenses include: a lens which is fixed to a lens holding frame main body which supports various components of the lens holding frame 12; a focus lens group and a variable magnification lens group which are movably supported in an optical axis direction; and a master lens group.

Various modes can be adopted for a type and the number of the lenses which configure the optical system, the structure of the diaphragm which also configures the optical system, and arrangement order and a relative position relation of these components. As an example, description is given of a rear focus type zoom lens apparatus, in which five lens groups of a fixed lens, a variable magnification lens, a front master lens, a focus lens, and a rear master lens are disposed in the stated order from an object side, and an iris diaphragm is disposed immediately before the front master lens.

A plurality of operation rings (21 to 26) which are rotatable with respect to the lens holding frame main body are provided in an outer peripheral part of the lens holding frame 12 (lens holding frame main body). In the present embodiment, focus rings 21 and 22, a zoom ring 24 coupled to the variable magnification lens group, and an iris ring 26 coupled to the diaphragm are disposed from the front side (object side) as the operation rings. When the focus rings 21 and 22 are rotated, the focus lens group moves in the optical axis direction so as to interlock therewith, so that a focal position (a subject distance at which the lenses come into focus) as the entire optical system changes.

When the zoom ring 24 is rotated, the zoom lens group moves in the optical axis direction so as to interlock therewith, so that a focal length as the entire optical system changes. When the iris ring 26 is rotated, the diaphragm is opened or closed so as to interlock therewith, so that an aperture value as the entire optical system changes.

Gear teeth 21A, 22A, 24A, and 26A are formed on outer peripheral surfaces of the first focus ring 21, the second focus ring 22, the zoom ring 24, and the iris ring 26, respectively. The gear teeth 21A, 22A, 24A, and 26A of the operation rings each mesh with a corresponding coupling gear (a coupling gear of a drive mechanism provided correspondingly to a drive target) provided in the drive unit 14.

The first focus ring 21 has a rotation range which is not restricted, and thus can be rotated in an endless manner. Further, the first focus ring 21 is provided slidably in the optical axis direction (front-to-rear direction). On the other hand, the second focus ring 22 has a rotation range which is restricted by a stopper member (not shown). For example, the rotation of the second focus ring 22 is restricted so as to fall within a range of about 120 degrees.

When the first focus ring 21 is set to a prescribed rear-side position in the optical axis direction, the first focus ring 21 and the second focus ring 22 are coupled to each other, and the first focus ring 21 and the second focus ring 22 are integrally rotated. In this state, in the case where the first focus ring 21 is rotated, the first focus ring 21 can be rotated only within a rotatable range of the second focus ring 22.

On the other hand, when the first focus ring 21 is set to a prescribed front-side position, the first focus ring 21 and the second focus ring 22 are uncoupled from each other. As a result, the first focus ring 21 can be rotated in an endless manner.

The configuration of the focus rings (21 and 22) as described above serves to switch between a focus operation according to a relative position instruction method and a focus operation according to an absolute position instruction method on the basis of the sliding movement (the position in the optical axis direction) of the first focus ring 21, and such a configuration is disclosed in Japanese Patent Application Laid-Open No. 2007-178633. In the case where the first focus ring 21 is set to the prescribed front-side position, the focus operation according to the relative position instruction method is performed. In the case where the first focus ring 21 is set to the prescribed rear-side position, the focus operation according to the absolute position instruction method in which the rotation range thereof is restricted is performed.

In addition, a first fixing ring 28 and a second fixing ring 30 which are fixed to the lens holding frame main body are provided in the outer peripheral part of the lens holding frame 12. The first fixing ring 28 is disposed between the focus ring 22 and the zoom ring 24, and is formed integrally with the lens holding frame main body. The second fixing ring 30 is disposed between the zoom ring 24 and the iris ring 26, and is formed of a member separate from the lens holding frame main body. Although not illustrated in FIGS. 1 and 2, the iris ring 26 has a scale marked thereon for the aperture value, and the second fixing ring 30 has an index (index mark) which indicates a read position for the scale of the iris ring 26.

The "lens holding frame main body" herein refers to a member which supports the various components of the lens holding frame 12 and serves as a framework of the lens holding frame 12. It should be noted that it is also possible to configure the first fixing ring 28 which is formed integrally with the lens holding frame main body and the second fixing ring 30 as a "fixing lens holding frame" or a "fixing ring". The drive unit 14 is fixed to portions of the first fixing ring 28 and the second fixing ring 30 of the lens holding frame 12 via screws 34, 35, and 36.

Various operation members (reference numerals 40 to 48) are provided on an upper surface, a rear end surface, and a bottom surface of the drive unit 14. That is, as the operation members, a zoom seesaw switch 40, an iris mode change switch 41, an automatic switch 42, and a return switch 43 are provided on the upper surface of the drive unit 14 (see FIG. 1), and a recording switch 44 is provided on the rear end surface of the drive unit 14 (see FIG. 2).

The zoom seesaw switch 40 is the operation member which serves to change a focal length of the lens holding frame 12. The zoom seesaw switch 40 is swingable back and forth with respect to an axis substantially orthogonal to an optical axis. When a telephoto side convex part of the zoom seesaw switch 40 on the front side is pressed, the variable magnification lens inside the lens holding frame 12 moves toward a telephoto side. Conversely, when a wide-angle side convex part thereof on the rear side is pressed, the variable magnification lens moves toward a wide-angle side. In both of the pressing operations toward the telephoto side and the wide-angle side, a magnification-varying speed can be adjusted by a pressing amount (operation amount) of the zoom seesaw switch 40, and the larger the pressing amount is, the higher the magnification-varying speed becomes. It should be noted that the zoom seesaw switch 40 returns to its neutral position when the pressing is released.

The iris mode change switch 41 is the operation member which serves to switch between an automatic mode in which iris adjustment is automatically performed and a manual mode in which the iris adjustment is manually performed. When a finger knob of the iris mode change switch 41 is slid back and forth along a direction substantially parallel to the optical axis, it is possible to selectively set any one of the automatic mode and the manual mode.

The automatic switch 42 is a switch for temporarily switching to the automatic mode when the iris adjustment is set to the manual mode. The iris adjustment is switched to the automatic mode only when the automatic switch 42 is being pressed.

The return switch 43 is a switch for switching whether or not another screen such as a screen on the air or a screen being photographed by another camera is displayed on a viewfinder (an image display apparatus provided in the camera main body (not shown)) of the camera. Each time the return switch 43 is pressed, whether or not another screen is displayed on the viewfinder is switched.

The recording switch 44 is a switch for instructing to start and stop the recording of a photographed image. Each time a pressing operation is performed on the recording switch 44, the instruction is switched between the recording start and the recording stop. When the recording is started, a video picture being photographed is recorded in a recording medium such as a videotape or a memory.

In addition, as illustrated in FIG. 2, a flange back distance adjustment switch 46 and an electrical/manual zoom switching lever 48 are provided on the bottom surface of the drive unit 14 according to the present embodiment.

The flange back distance adjustment switch 46 is a switch which is pressed when a flange focal length is adjusted. When the switch 46 is long pressed (for example, for 3 seconds), if predetermined conditions are satisfied, the lens apparatus 10 makes the transition to a flange back distance adjustment mode. It should be noted that the conditions for making the transition to the flange back distance adjustment mode are described later. If the flange back distance adjustment operation is completed or if a predetermined time (for example, 2 minutes) have elapsed since the transition to the flange back distance adjustment mode, the flange back distance adjustment mode is automatically terminated, so that the lens apparatus 10 returns to a photography mode in which a normal photographing operation is possible.

The electrical/manual zoom switching lever 48 is a lever for switching between an electrical zoom operation using the zoom seesaw switch 40 of the drive unit 14 and a manual zoom operation in which a rotation operation is manually performed on the zoom ring 24.

It should be noted that reference numeral 50 in FIG. 2 designates a part of a cable for connecting with the television camera (not shown). The camera main body (not shown) coupled to the mount part 20 of the lens holding frame 12 is electrically connected to the drive unit 14 via the cable 50, and electric power and various signals are exchanged therebetween. Reference numeral 52 designates a connector for connecting with a remote control system. Reference numeral 54 designates a belt through hole for attaching a grip belt (not shown). As designated by reference numeral 55 in FIG. 1, a belt through hole is formed also in a front-side end part of the drive unit 14, and the grip belt is attached by being inserted into the front and rear belt through holes 54 and 55.

A photographer can hold the lens holding frame 12 together with the drive unit 14 by inserting his/her right hand (four fingers other than a thumb) between a casing (case) 60 of the drive unit 14 and the grip belt. In addition, the recording switch 44 is located at a position at which, when the photographer grips the drive unit 14 with his/her right hand as described above, the thumb of his/her right hand is naturally placed (see FIG. 2).

A slide macro ON/OFF switch, an AF/MF change switch, and a nonlock type AF push switch are provided on a side surface of a mount attachment frame 16, and output signals generated by an operation on these switches are supplied to the drive unit 14 via a lead wire.

Here, the macro ON/OFF switch is a switch for turning on/off a macro photography mode. The AF/MF change switch is a switch for switching between an automatic focus (AF) mode and a manual focus (MF) mode. In the AF mode, the focus lens is automatically moved so that the contrast of a subject image becomes maximum, to thereby perform focal point adjustment. In the MF mode, a rotation operation is manually performed on the first focus ring 21 for moving the focus lens, to thereby perform focal point adjustment. The AF push switch is a switch for switching to the AF mode only during a period during which a key top thereof is pressed down (pushed), in the case where switching has been made to the MF mode by the AF/MF change switch.

In the case where switching has been made to the AF mode by the AF/MF change switch, irrespective of the operations on the first focus ring 21 and the second focus ring 22, the drive unit 14 performs AF control in which the focus lens is automatically moved to an in-focus position.

On the other hand, in the case where switching has been made to the MF mode by the AF/MF change switch, a full MF mode (with an end) and an AF/MF mode (without an end) are switched therebetween in accordance with a slide position of the first focus ring 21.

It should be noted that the drive unit 14 includes an optical sensor (not shown) which detects a position of the first focus ring 21 in the front-to-rear direction. The drive unit 14 can detect the slide position of the first focus ring 21 in the optical axis direction (whether or not the first focus ring 21 is coupled to the second focus ring 22) on the basis of a detection signal from the optical sensor. In the case where the first focus ring 21 is coupled to the second focus ring 22, the drive unit 14 makes switching to the full MF mode. In the case where the first focus ring 21 is not coupled to the second focus ring 22, the drive unit 14 makes switching to the AF/MF mode.

When switching is made to the full MF mode, the focus lens can be moved to a position corresponding to a desired camera-to-subject distance by manually operating the first focus ring 21. In addition, in the full MF mode, the rotation range of the first focus ring 21 is restricted via the second focus ring 22, and on the basis of an operational feeling when the first focus ring 21 reaches an end, an operator can recognize that the focus lens reaches a closest end or an infinite distance. Such a focus operation only by the first focus ring 21 is a method which a professional photographer and the like are used to adopting.

On the other hand, in the AF/MF mode in which the first focus ring 21 is not coupled to the second focus ring 22, focus control can be performed by selectively using as appropriate the MF mode in which the first focus ring 21 is rotated to thereby move the focus lens and the AF mode realized by pressing down the AF push switch as described above.

It should be noted that the first focus ring 21 is not coupled to the second focus ring 22 in the AF/MF mode, and hence the rotation range thereof is not restricted, so that the first focus ring 21 can be rotated in an endless manner. However, when the focus lens moves to a position of the infinite distance end or the closest end, the drive unit 14 does not to output an order to move beyond the end.

In addition, switching is temporarily made to the AF mode by pressing down the AF push switch in the AF/MF mode, and then switching is made back to the MF mode by releasing his/her finger from the AF push switch. At this time, starting from the position of the focus lens which has automatically come into focus in the AF mode as an initial position, the position of the focus lens can be changed by an operation amount on the first focus ring 21, which enhances the usability.

The drive unit 14 attached to the side surface of the lens holding frame 12 is entirely covered by the casing (case) 60 made of metal. The casing 60 has a substantially egg-like shape (a contour of an egg laid on its side along the optical axis of the lens holding frame 12) so as to fit naturally into a palm of a photographer who grips the casing 60 with his/her right hand. The casing 60 includes two framework parts (frame parts) with a plane roughly along the optical axis direction of the lens holding frame 12 being as a division plane therebetween. That is, the casing 60 has a structure (two-division shell structure) in which a first framework 62 forming a side surface on the lens holding frame 12 side and a second framework 64 forming an outer side surface to be brought into contact with the palm of the photographer are faced and coupled to each other.

The first framework 62 has a first fixing part 66 and a second fixing part 68 formed therein as a fixing structure to the lens holding frame 12, and the first fixing part 66 and the second fixing part 68 extend out at positions opposed to respective portions of the first fixing ring 28 and the second fixing ring 30 of the lens holding frame 12. The first fixing part 66 and the second fixing part 68 each have a concave coupling surface based on a round shape substantially along an outer peripheral surface (cylindrical surface) of each of the first fixing ring 28 and the second fixing ring 30. The first fixing part 66 is fixed to the first fixing ring 28 with the screw 34, and the second fixing part 68 is fixed with the screw 35. It should be noted that the second fixing part 68 is provided also on a lower side of the lens holding frame 12 (see FIG. 2), and the lower second fixing part 68 is fixed with the screw 36. With such a structure, the first framework 62 of the drive unit 14 is fixed to the peripheral side surface of the lens holding frame 12.

The second framework 64 configured as a member separate from the first framework 62 is coupled to the first framework 62 with a screw 69 with positions of coupling parts (not shown) formed on peripheral edges of the two frameworks being matched each other. In this way, the first framework 62 and the second framework 64 are coupled to each other, to thereby configure the casing 60 of the drive unit 14.

The casing 60 houses therein: motors which configure drive mechanisms such as a focus drive mechanism, a zoom drive mechanism, an iris drive mechanism, and a master drive mechanism; a potentiometer; and drive mechanism members for power transmission, such as a gear train. In addition, the casing 60 includes: an optical sensor which detects the position of the first focus ring 21 in the front-to-rear direction; a circuit board on which a motor control circuit for each drive mechanism, a control circuit which exchanges signals with the camera, and the like are mounted; and a protection cover which partitions between the drive mechanism members and a main board.

It is desirable that at least a surface of the protection cover have insulating properties. In addition, in order to provide both the insulating properties on the surface and a shield function against electrical noise generated by the motors and the like, it is possible to adopt, for example, a configuration in which a surface of a shield layer made of a metal thin film or the like is covered by an insulating plastic resin.

Figure 3:
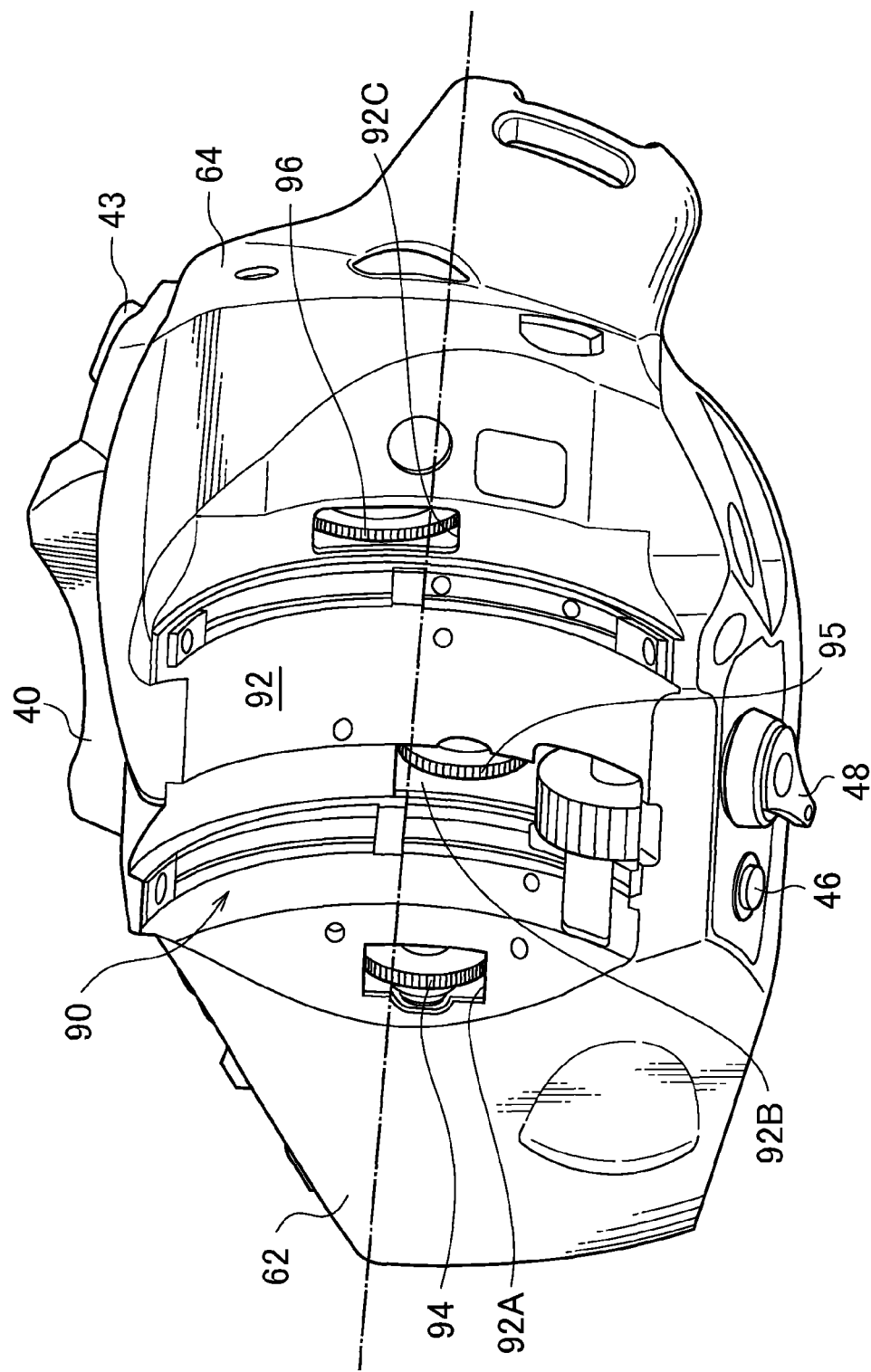
FIG. 3 is a perspective view illustrating a drive unit which is detached from a lens holding frame.

FIG. 3 is a perspective view illustrating, from the first framework 62 side, the drive unit 14 which is detached from the lens holding frame 12.

As illustrated in FIG. 3, a coupling part 90 of the drive unit 14 to the lens holding frame 12 has a concave coupling surface 92 which is curved along the cylindrical surface correspondingly to the outer peripheral shape of the lens holding frame 12. An outer surface shape of each of the operation rings (21 to 26), the fixing rings (28 and 30), and the like provided in the outer peripheral part of the lens holding frame 12 is based on the cylindrical surface whose central axis is the optical axis of the optical system (the central axis of the lens holding frame 12). Accordingly, the coupling surface 92 of the drive unit 14 which is placed on the side surface of the lens holding frame 12 is based on a shape along (a part of) the cylindrical surface whose central axis is the optical axis, and has a shape along a cylindrical surface having a diameter and dimensions (not limited to the same diameter) which allow the coupling surface 92 to maintain a predetermined interval with any members of the lens holding frame 12 and not to come into contact therewith.

Openings 92A, 92B, and 92C are formed on the coupling surface 92 of the first framework 62 at portions opposed to the respective operation rings, and a part of respective coupling gears 94, 95, and 96 are exposed at the openings 92A, 92B, and 92C so as to protrude from the coupling surface 92 to the outside.

In the state where the drive unit 14 is set to the lens holding frame 12, the coupling gears 94 to 96 mesh with the gear teeth 21A to 26A corresponding to the operation rings.

Although not illustrated, the coupling gears 94 to 96 are each coupled to the corresponding motor, the corresponding potentiometer, and the like inside the casing 60 of the drive unit 14.

Accordingly, a current setting position of each of the focus lens group, the zoom (variable magnification) lens group, and the diaphragm inside the lens holding frame 12 is detected by the potentiometer inside the drive unit 14, and the focus lens group, the zoom (variable magnification) lens group, and the diaphragm can be driven by the motors inside the casing 60 of the drive unit 14.

In the present embodiment, all of the focus lens group, the zoom (variable magnification) lens group, and the diaphragm can be electrically driven by the drive unit 14. In carrying out the present invention, however, not all of these movable components are necessarily required to be driven by the drive unit 14, and it is sufficient to provide a drive unit which can drive at least one of these movable components. However, in the case of a lens apparatus used in a television camera, it is desirable to provide a drive unit which can drive at least the variable magnification lens group.

Figure 4:
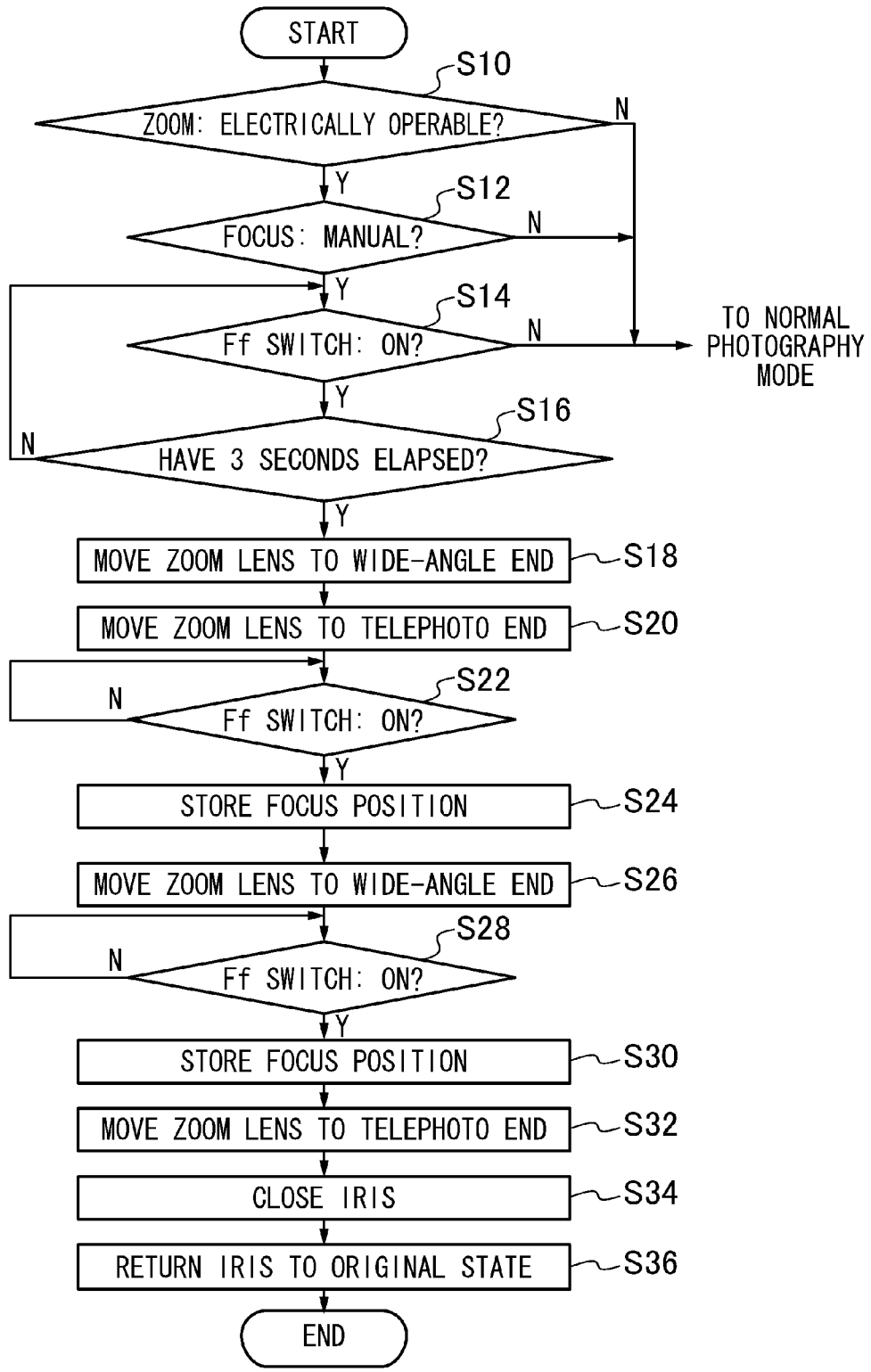
FIG. 4 is a flow chart showing an example of an operation flow for flange back distance adjustment.

In the present embodiment, when the mount part 20 of the lens apparatus 10 is fitted to the camera main body (not shown) and a photographer then performs a predetermined operation, the lens apparatus 10 makes the transition to the flange back distance adjustment mode. FIG. 4 is a flow chart showing an example of an operation flow for the flange back distance adjustment mode in the lens apparatus 10. Hereinafter, with reference to the flow chart of FIG. 4, the flange back distance adjustment mode is described. It should be noted that respective processes described here are executed by a CPU (corresponding to the control circuit) which comprehensively controls operations of the respective parts of the drive unit 14 (or the lens apparatus 10), unless otherwise defined.

In the flow chart shown in FIG. 4, in first four Steps S10 to S16, it is determined whether or not the conditions for making the transition from the normal photography mode to the flange back distance adjustment mode are established.

Specifically, first of all, it is determined whether or not an operation mode of the zoom lens is an electrically operable mode, that is, whether or not the electrical/manual zoom switching lever 48 is set to the electrical zoom operation side (Step S10).

If the electrical/manual zoom switching lever 48 is set to the manual zoom operation side (No in Step S10), it is understood that the transition conditions to the flange back distance adjustment mode are not satisfied, and the lens apparatus 10 returns to the normal photography mode.

On the other hand, if the electrical/manual zoom switching lever 48 is set to the electrical zoom operation side (Yes in Step S10), it is determined whether or not a control mode of the focus lens is the manual focus mode, that is, whether or not the AF/MF change switch is set to the MF mode (manual focus mode) (Step S12).

If the AF/MF change switch is set to the AF mode (automatic focus mode) (No in Step S12), it is understood that the transition conditions to the flange back distance adjustment mode are not satisfied, and the lens apparatus 10 returns to the normal photography mode.

On the other hand, if the AF/MF change switch is set to the MF mode (Yes in Step S12), it is determined whether or not the flange back distance adjustment switch (Ff switch) 46 is pressed (is turned on) (Step S14).

If the flange back distance adjustment switch 46 is not pressed (No in Step S14), it is understood that the transition conditions to the flange back distance adjustment mode are not satisfied, and the lens apparatus 10 returns to the normal photography mode.

On the other hand, if the flange back distance adjustment switch 46 is pressed (Yes in Step S14), it is determined whether or not 3 seconds or longer have elapsed since the flange back distance adjustment switch 46 is pressed (Step S16).

If 3 seconds have not elapsed since the flange back distance adjustment switch 46 is pressed (No in Step S16), the processing returns to Step S14, and it is determined again whether or not the flange back distance adjustment switch 46 is pressed. That is, if the flange back distance adjustment switch 46 is not long pressed continuously for 3 seconds or longer, it is understood that the transition conditions to the flange back distance adjustment mode are not satisfied, and the lens apparatus 10 returns to the normal photography mode.

On the other hand, if 3 seconds or longer have elapsed since the flange back distance adjustment switch 46 is pressed (Yes in Step S16), the lens apparatus 10 makes the transition to the flange back distance adjustment mode.

In the present embodiment, the following three conditions are required to be satisfied as the transition conditions from the normal photography mode to the flange back distance adjustment mode: (1) the operation mode of the zoom lens is the electrically operable mode; (2) the control mode of the focus lens is the manual focus mode; and (3) the flange back distance adjustment switch 46 is long pressed for a predetermined time (in the present embodiment, 3 seconds) or longer. In the present embodiment, in the case where the manual focus mode is selected, the full MF mode (with an end) and the AF/MF mode (without an end) are switched therebetween in accordance with the slide position of the first focus ring 21. As the transition conditions to the flange back distance adjustment mode, any of these manual focus modes may be selected.

After the lens apparatus 10 makes the transition to the flange back distance adjustment mode, the flange focal length is adjusted in the following procedure so that the lens apparatus 10 comes into focus on both of the telephoto side and the wide-angle side. It is assumed that the photographer has selected an appropriate subject at the latest until this adjustment operation is started.

In addition, in the flange back distance adjustment, in order to reduce a depth of a subject, it is preferable that the diaphragm be opened, but in the case of a high brightness subject, a video picture signal of the television camera may be saturated to make appropriate focusing impossible. Therefore, in the present embodiment, the photographer can manually adjust an aperture diameter of the diaphragm in accordance with the subject which is photographed when the flange back distance adjustment is performed. It should be noted that a subject distance when the flange back distance adjustment is performed is not particularly limited, and a subject distance of, for example, 3 m is preferably adopted.

After the transition to the flange back distance adjustment mode, first, the zoom lens is temporarily moved to the wide-angle end (Step S18), and then, the zoom lens which has been moved to the wide-angle end is moved to the telephoto end (Step S20).

The zoom lens is moved over an entire movable range thereof as described above, whereby a large change in angle of view is generated in an image (video picture) photographed by the television camera. As a result, the photographer can instantly know that the lens apparatus 10 has made the transition to the flange back distance adjustment mode.

After the zoom lens is moved to the telephoto end as described above, the lens apparatus 10 is in a standby state until focusing by the photographer is completed. Specifically, it is determined whether or not the flange back distance adjustment switch 46 is pressed (Step S22), and the current state is maintained until the flange back distance adjustment switch 46 is pressed by the photographer.

During this standby state, the photographer rotates the first focus ring 21 with the zoom lens being set to the telephoto end, to thereby perform the focusing, and presses the flange back distance adjustment switch 46 when the lens apparatus 10 comes into focus.

If the flange back distance adjustment switch 46 is pressed (Yes in Step S22), the position of the focus lens at this time is stored (Step S24). It should be noted that the focus position is stored in a memory (not shown) or the like.

Next, the zoom lens is moved from the telephoto end to the wide-angle end (Step S26). Then, similarly to Step S22 described above, the lens apparatus 10 is in the standby state until the photographer presses the flange back distance adjustment switch 46. During this standby state, the photographer rotates the first focus ring 21 with the zoom lens being set to the wide-angle end, to thereby perform the focusing, and presses the flange back distance adjustment switch 46 when the lens apparatus 10 comes into focus.

If the flange back distance adjustment switch 46 is pressed (Yes in Step S28), the position of the focus lens at this time is stored (Step S30).

As described above, the flange focal length is sequentially adjusted so that the lens apparatus 10 comes into focus on both of the telephoto side and the wide-angle side, and the position of the focus lens at each adjustment is stored in the memory or the like. After that, the zoom lens is returned to its original position on the telephoto side (Step S32). It should be noted that the initial position of the zoom lens in the flange back distance adjustment mode is stored in the memory or the like.

Lastly, in order to notify the photographer that the flange back distance adjustment mode is normally completed, the diaphragm is once closed to a minimum aperture diameter (Step S34). Then, the diaphragm is opened again to its original aperture diameter before the closing (Step S36). At this time, in order to enable the photographer to more certainly know the end of the flange back distance adjustment mode, the diaphragm may be once changed from the minimum aperture diameter to a maximum aperture diameter (or in the opposite way) and then returned to its original aperture diameter.

After the opening/closing operation of the diaphragm is performed as described above as the operation for notifying the photographer of the end of the flange back distance adjustment mode, the lens apparatus 10 terminates the flange back distance adjustment mode, and returns to the normal photography mode. As a result, the normal photographing operation becomes possible.

As described above, if a predetermined time (for example, 2 minutes) have elapsed since the transition to the flange back distance adjustment mode, the flange back distance adjustment mode is automatically terminated, so that the lens apparatus 10 returns to the normal photography mode. Also in such a case, similarly to the case where the flange back distance adjustment is normally completed, it is preferable to perform the opening/closing operation of the diaphragm, to thereby notify the photographer that the lens apparatus 10 returns to the normal photography mode.

FIG. 5 is a flow chart showing another example of the operation flow for the flange back distance adjustment mode in the lens apparatus 10. In FIG. 5, the processes common to those of FIG. 4 are designated by the same reference characters, and description thereof is omitted.

In the example shown in FIG. 5, as the operation for notifying the photographer of the transition to the flange back distance adjustment mode, instead of moving the zoom lens from the wide-angle end to the telephoto end, the diaphragm is once closed to the minimum aperture diameter (Step S40). Then, the diaphragm is opened again to its original aperture diameter before the closing (Step S42).

Alternatively, although illustration is omitted, as the operation for notifying the photographer of the transition from the normal photography mode to the flange back distance adjustment mode, the move of the zoom lens and the opening/closing operation of the diaphragm may be combined. The same holds for the case where the lens apparatus 10 returns to the normal photography mode from the flange back distance adjustment mode. The combination of the move of the zoom lens and the opening/closing operation of the diaphragm enables a user to certainly know the change in mode without missing the mode transition, even if the change in any one of the move and the opening/closing operation is small.

As has been described hereinabove, according to the present embodiment, at the time of the mode transition between the photography mode and the adjustment mode, the aperture diameter of the diaphragm and the position of the zoom lens are changed.

Accordingly, a photographer can instantly know whether or not the lens apparatus is in the flange back distance adjustment mode, only by checking a video picture photographed by the television camera. As a result, it is possible to eliminate the need to additionally provide a display device or a display circuit therefor, and to downsize the lens apparatus and reduce the cost.

What is claimed is:

1. A lens apparatus including a focus lens which is driven for bringing a desired subject into focus, a zoom lens which is driven for changing a focal length, and a diaphragm having an aperture diameter which is changed for adjusting an amount of photography light and adjusting a position of the focus lens to perform a flange back distance adjustment, the lens apparatus comprising:

a diaphragm control device which changes the aperture diameter of the diaphragm at a time of mode transition between a photography mode in which a normal photographing operation is possible and an adjustment mode in which the flange back distance adjustment is possible, wherein, at a time of transition from the adjustment mode to the photography mode, the diaphragm control device changes the aperture diameter of the diaphragm to a minimum value, and then returns the aperture diameter to an original state of the aperture diameter.

2. A lens apparatus including a focus lens which is driven for bringing a desired subject into focus, a zoom lens which is driven for changing a focal length, and a diaphragm having an aperture diameter which is changed for adjusting an amount of photography light and adjusting a position of the focus lens to perform a flange back distance adjustment, the lens apparatus comprising:

a diaphragm control device which changes the aperture diameter of the diaphragm at a time of mode transition between a photography mode in which a normal photographing operation is possible and an adjustment mode in which the flange back distance adjustment is possible, wherein, at a time of transition from the photography mode to the adjustment mode, the diaphragm control device changes the aperture diameter of the diaphragm to a minimum value, and then returns the aperture diameter to an original state of the aperture diameter.

3. The lens apparatus according to claim 1, wherein, at a time of transition from the photography mode to the adjustment mode, the diaphragm control device changes the aperture diameter of the diaphragm to the minimum value, and then returns the aperture diameter to the original state of the aperture diameter.

4. The lens apparatus according to claim 1, wherein the diaphragm control device further changes the aperture diameter of the diaphragm to a maximum value after changing the aperture diameter to the minimum value, and then returns the aperture diameter to the original state of the aperture diameter.

5. The lens apparatus according to claim 3, wherein the diaphragm control device further changes the aperture diameter of the diaphragm to a maximum value after changing the aperture diameter to the minimum value, and then returns the aperture diameter to the original state of the aperture diameter.

6. The lens apparatus according to claim 1, further comprising:
a zoom lens control device which changes a position of the zoom lens at the time of the mode transition between the photography mode and the adjustment mode.

7. The lens apparatus according to claim 5, further comprising:
a zoom lens control device which changes a position of the zoom lens at the time of the mode transition between the photography mode and the adjustment mode.

8. The lens apparatus according to claim 6, wherein, at the time of the transition from the photography mode to the adjustment mode, the zoom lens control device once moves the zoom lens to one of a wide-angle end and a telephoto end, and then moves the zoom lens to the other of the wide-angle end and the telephoto end.

9. The lens apparatus according to claim 7, wherein, at the time of the transition from the photography mode to the adjustment mode, the zoom lens control device once moves the zoom lens to one of a wide-angle end and a telephoto end, and then moves the zoom lens to the other of the wide-angle end and the telephoto end.

10. The lens apparatus according to claim 8, wherein, at the time of the transition from the photography mode to the adjustment mode, the zoom lens control device once moves the zoom lens to the wide-angle end, and then moves the zoom lens to the telephoto end.

11. The lens apparatus according to claim 9, wherein, at the time of the transition from the photography mode to the adjustment mode, the zoom lens control device once moves the zoom lens to the wide-angle end, and then moves the zoom lens to the telephoto end.

12. The lens apparatus according to claim 2, wherein, wherein the diaphragm control device further changes the aperture diameter of the diaphragm to a maximum value after changing the aperture diameter to the minimum value, and then returns the aperture diameter to the original state of the aperture diameter.

13. The lens apparatus according to claim 2, further comprising:
a zoom lens control device which changes a position of the zoom lens at the time of the mode transition between the photography mode and the adjustment mode.

14. The lens apparatus according to claim 13, wherein, at the time of the transition from the photography mode to the adjustment mode, the zoom lens control device once moves the zoom lens to one of a wide-angle end and a telephoto end, and then moves the zoom lens to the other of the wide-angle end and the telephoto end.

15. The lens apparatus according to claim 14, wherein, at the time of the transition from the photography mode to the adjustment mode, the zoom lens control device once moves the zoom lens to the wide-angle end, and then moves the zoom lens to the telephoto of the wide-angle end and the telephoto end.

16. The lens apparatus according to claim 12, further comprising:
a zoom lens control device which changes a position of the zoom lens at the time of the mode transition between the photography mode and the adjustment mode.

17. The lens apparatus according to claim 16, wherein, at the time of the transition from the photography mode to the adjustment mode, the zoom lens control device once moves the zoom lens to one of a wide-angle end and a telephoto end, and then moves the zoom lens to the other of the wide-angle end and the telephoto end.

18. The lens apparatus according to claim 17, wherein, at the time of the transition from the photography mode to the adjustment mode, the zoom lens control device once moves the zoom lens to the wide-angle end, and then moves the zoom lens to the telephoto of the wide-angle end and the telephoto end.

* * * * *